United States Patent
Jensen et al.

[11] Patent Number: 5,941,695
[45] Date of Patent: Aug. 24, 1999

[54] SUBMERSIBLE MOTOR FOR DRIVING A CENTRIFUGAL PUMP HAVING A SEPARATING WALL DISPOSED IN A ROTOR CHAMBER-SPACE

[75] Inventors: Niels Due Jensen; Tonny Ring Nielsen, both of Bjerringbro; Peter Elvekjaer, Ulstrup; Aage Bruhn; Henrik Vinter, both of Bjerringbro, all of Denmark

[73] Assignee: Grundfos a/s, Bjerringbro, Germany

[21] Appl. No.: 08/862,974

[22] Filed: May 23, 1997

[30] Foreign Application Priority Data

May 23, 1996 [DE] Germany .................. 196 20 901

[51] Int. Cl.⁶ .................................. F04B 17/03
[52] U.S. Cl. ..................... 417/423.3; 417/423.15
[58] Field of Search ................ 310/87, 86, 61; 103/87; 417/406, 407, 423.11, 423.1, 423.3

[56] References Cited

U.S. PATENT DOCUMENTS

| | | | |
|---|---|---|---|
| 2,568,548 | 9/1951 | Howard et al. | 310/86 |
| 2,958,292 | 11/1960 | Lipe et al. | 310/86 |
| 3,487,457 | 12/1969 | Drouard et al. | 310/86 |
| 4,664,605 | 5/1987 | Asano et al. | 417/407 |
| 4,725,206 | 2/1988 | Glaser et al. | 417/407 |
| 4,752,193 | 6/1988 | Horler | 417/407 |
| 5,367,214 | 11/1994 | Turner | 310/87 |
| 5,622,222 | 4/1997 | Wilson et al. | 310/87 |

FOREIGN PATENT DOCUMENTS

| | | |
|---|---|---|
| 0346730 | 12/1989 | European Pat. Off. . |
| 1528848 | 12/1971 | Germany . |

*Primary Examiner*—Charles G. Freay
*Assistant Examiner*—Robert Z. Evora
*Attorney, Agent, or Firm*—Jacox, Meckstroth & Jenkins

[57] ABSTRACT

A submersible motor for driving a centrifugal pump. The motor includes a rotor space filled with a fluid and the rotor space on the pump side is sealed by way of a sealing formation penetrated by the motor shaft which carries the rotor of the motor. In the rotor space between the sealing formation and the rotor there is provided a stationary separating wall, letting through the motor shaft, for forming a smoothing space in front of the sealing formation.

6 Claims, 1 Drawing Sheet

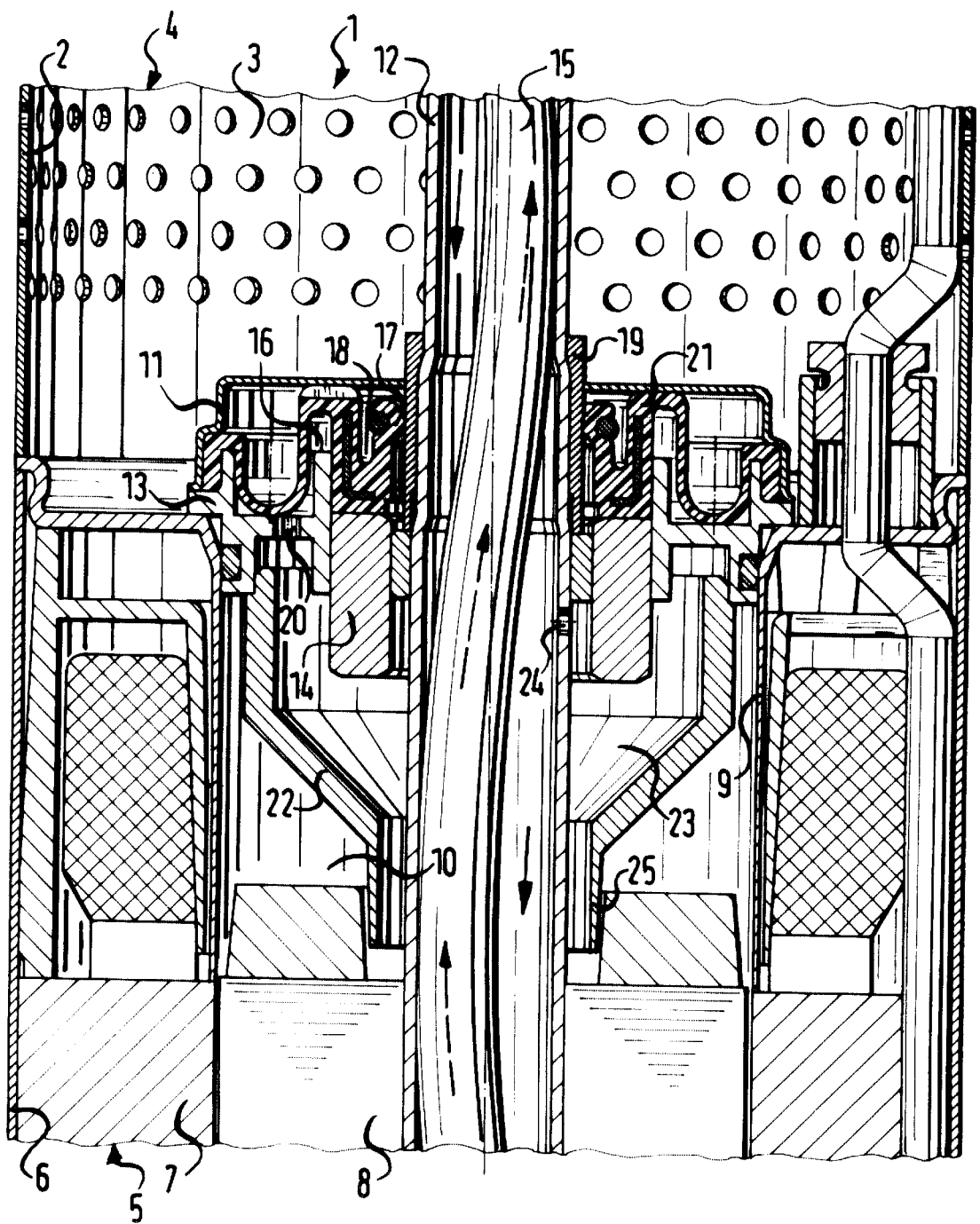

SUBMERSIBLE MOTOR FOR DRIVING A CENTRIFUGAL PUMP HAVING A SEPARATING WALL DISPOSED IN A ROTOR CHAMBER-SPACE

BACKGROUND OF THE INVENTION

The invention relates to a submersible motor for driving a centrifugal pump.

A typical submersible motor is for example shown and described in EP-A-0 346 730. It drives a multi-stage centrifugal pump and together with this, forms a submersible pump unit. The submersible motor is of the canned motor construction type, in whose canned pot the motor is fastened on a common shaft on which the impeller group of the centrifugal pump is mounted. The rotor space is sealed by an end plate which carries the pump-side radial bearing of the motor, for supporting the common shaft, and by a sealing formation opposite the pump suction space. The sealing formation comprises a contact seal resting on the shaft, for example a lip seal and volume compensation means, for example a diaphragm, for the fluid located in the rotor space. This fluid which as a rule is a glycol-water mixture and which serves for removing the heat from the motor as well as serving as a lubrication means for the motor bearings, circulates in a closed circuit which consists of the rotor space of the motor and the hollow space of the common shaft. Such submersible pump units are commonly driven in deep wells and are often driven at high rotational speed.

Since a dynamic sealing (contact sealing) does not absolutely seal, in the course of the operating period of the submersible pump unit, an exchange of fluid from the rotor space with a component of the delivery flow must be taken into account. This loss of fluid from the rotor space is then not disadvantageous when, for this, delivery fluid reaches into the rotor space. If however fluid with gases dissolved therein are delivered and then components thereof seep into the rotor space during which the rotor space fluid is displaced, problems arise which increase the more the unit is driven in the part load region.

Although the previously described submersible pump unit has generally proved itself, those problems with the delivery of fluids which have a relatively high gaseous component and which are delivered with a high rotational speed lead to bearing damage on the submersible motor which leads to a premature stoppage of the submersible pump unit. The seeping in of a considerable quantity of gas, released from the delivery flow in the pump suction space and pushed to the sealing location on the motor shaft, into the rotor space of the motor under displacement of fluid from the rotor space, seems to be the cause of this.

BRIEF SUMMARY OF THE INVENTION

The object of the invention lies in improving a submersible motor of the previously cited type to the effect that a displacement of fluid from the rotor space of the motor, particularly when the motor is driven at a high rotational speed, is essentially avoided.

This object is achieved as is specified in the submersible motor of patent claim 1.

It has been surprisingly established that with the provision of a separating wall between the sealing formation on the pump side and the rotor of the drive motor of the centrifugal pump, the fluid in the rotor space essentially no longer escapes from this space. In this way a premature failing of the motor, caused by the escaping of fluid from the rotor space and the replacement by a seeped-in gas component from the delivery flow, is avoided. An explanation for this surprising effect may be seen in that by way of a separating wall in front of the sealing formation, a smoothing space filled with fluid from the rotor space is created in which, should a certain gas component have seeped into this smoothing space, due to the usual perpendicular installation location of the motor pump unit in front of the sealing lip of the sealing formation, a barrier is formed. This barrier prevents the residual fluid, which is located in the smoothing space and is subjected to a considerably lower rotational speed than the fluid in the remaining rotor space of the motor because it only undergoes the rotational effect of the motor shaft and thus collects underneath in the smoothing space, from escaping upwards from the smoothing space. The cooling fluid in the remaining rotor space is subjected to a rotation with a higher centrifugal force effect by way of the considerably stronger rotation of the rotor, by which means the cooling fluid also has a correspondingly high displacement pressure but which due to the separating wall cannot affect the sealing formation in the motor shaft region. The constant lubrication, in particular of the upper motor shaft bearing is guaranteed in that the known circulation of fluid, in the rotor space and in the hollow shaft communicating with this space, for the purpose of removing the motor heat, is ensured by way of sufficiently present fluid. In the region of the upper motor bearing, the motor shaft has an opening from which spray fluid reaches this bearing.

One preferred design of the separating wall lies in designing it in the manner of a funnel which tapers in the direction towards the rotor of the motor. By way of this, the tendency of the residual fluid, on operation of the submersible motor, to collect in the lower region of the smoothing space is increased such that the previously mentioned barrier effect for preventing the exit of fluid from the smoothing space upwards is made easier.

A further advantage of the funnel shape of the separating wall lies in the fact that it displays a gas separating effect. Should a fluid having gas components reach the smoothing space, e.g. the spray fluid for the lubrication of the upper bearing of the motor, the gas component is again separated at the inclined funnel wall by the cyclone effect.

A further design feature lies in the fact that the circumferential region of the separating wall, on the shaft side comprises an axial sleeve-shaped extension on the rotor side. By these means it is made more difficult for the fluid to enter into the smoothing space from the rotor space.

Yet another design feature lies in the fact that the separating wall is fastened to the pump-side bearing plate of the motor. Alternatively, the separating wall and the end plate may be made from one piece. In this way, together with the bearing plate and the mentioned complete sealing formation, there is created a contructional unit which offers many advantages with respect to assembly since the separating wall together with the bearing plate and sealing formation may be assembled on the motor in one operational procedure.

BRIEF DESCRIPTION OF THE DRAWING

The invention is hereinafter described in more detail by way of one embodiment example shown in the accompanying drawing. FIG. 1 shows a part axial section through a submersible motor pump unit.

DETAILED DESCRIPTION OF THE INVENTION

Referring now to the drawing, a fragmentary view of a submersible pump unit 1 is shown. One suitable motor may be the submersible motor shown and described in European Patent Publication EP-A-0346730 which is incorporated herein be referenced and made a part hereof. Here there is shown only one housing wall 2, provided with a multitude of openings, of the section space 3 of the centrifugal pump 4. On the housing 2 there is connected underneath a partly represented submersible motor 5 which in its housing 6 contains the electrical stator 7 as well as the electrical rotor 8. The rotor 8 is shaded with respect to the stator 7 by way of a canned pot 9. The space 10 enclosed by the canned pot 9 is occluded with respect to the pump suction space 3 by way of a sealing formation 11. The sealing formation 11, which is centrally penetrated by a hollow shaft 12 of the unit 1, is for its part fastened to a bearing plate 13 which carries a radial bearing assembly 14 for the shaft 12 and which for its part is attached in a suitable manner to the canned pot 9 on the pump side. The hollow pump shaft 12 is provided with an additional flow channel 15 on its inside in the usual manner. The rotor space 10 as well as the channel 15 and the remaining hollow space of the shaft 12 are filled with a suitable fluid, in order firstly to remove the motor heat on operation of the submersible pump and to also lubricate the bearing assembly as well as the lower bearing of the motor 5 which is not shown. For this, the fluid circulates in the known manner according to the arrows indicated so that from the space 10 via the channel 15, the fluid reaches into the centrifugal pump region where it is cooled and flows back to the space 10 through the hollow shaft 12.

The sealing formation 11 comprises a diaphragm 16 which is centrally penetrated by the shaft 12 and is provided with a sealing lip 17 on the circumferential edge region on the shaft side, this sealing lip being pressed against a sleeved working part 19 of the shaft 12 by means of an annular spring 18, in order to seal the suction space 3 of the centrifugal pump with respect to the rotor space 10. The diaphragm 16, in the usual manner, provides for volume compensation when the fluid in the rotor space 10 has been warmed. For this, the bearing plate 13 comprises at least one opening 20. In order to keep at bay mechanical damage to the diaphragm 16, a covering cap 21 is provided which additionally presses the outer circumferential edge of the diaphragm rigidly on the bearing plate 13.

For example, connected to the bearing plate 13 there is preferably a closed-walled, stationary separating wall 22 which lets through the motor shaft 12. In this way, there is additionally formed in the rotor space 10 a smoothing space 23 which is located between the bearing plate 13 and the rotor 8 of the motor 5.

In the example shown, the separating wall 22 is formed in the manner of a funnel which tapers in the direction towards the rotor 8. In this way, amongst other things there is a cyclone effect with a gas separation effect. Between the hollow motor shaft 12 and the separating wall 22 there is left a certain amount of play so that amongst other things, with the assembly wall, fluid can reach into the smoothing space 23 from the rotor space. This play between the motor shaft 12 and the separating wall is roughly 0.1 to 0.5 times the outer diameter of the motor shaft 12.

It is clear that the fluid from the rotor space 10, due to the rotating rotor 8, is rotated with a substantially higher circumferential speed than that fluid which is located in the smoothing space 23. The fluid in the space 23 only undergoes the cause of the rotation of the motor shaft 12 which has a considerably smaller radial extension than the rotor 8. If, with the delivery of a fluid with a dissolved gas content, a certain component of the released gas component should penetrate into the smoothing space 23 by overcoming the lip seal 17, then in the upper part of smoothing space there is formed a gas bubble through which no further fluid may be pressed out upwardly out of the smoothing space 23. The reason for this can be seen in the fact that the gravitational force effect of the fluid remaining in the smoothing space 23, due to its relatively low rotational speed, overcomes an upwardly directed force. In this way a further escaping of fluid from the smoothing space 23 upwardly through the sealing formation 11 is prevented. Thus there is ensured the secure cooling of the motor 5 as well as the lubrication of the lower motor bearing and the upper motor bearing 14. An opening 24 in the motor shaft 12 at the height of the radial bearing 14 ensures an adequate spray lubrication of the bearing 14 should there have formed an air bubble in this region.

In order to make the inflow or fluid from the remaining rotor space 10 into the smoothing space 23 on operation of the unit more difficult, the circumferential edge region, on the shaft side, of the separating wall 22 comprises an axial and sleeve-shaped extension 25 on the rotor side which points to the rotor 8. By way of this, the tendency for the fluid to remain in the rotor space 10 due to the relatively quick rotation of the rotor 8 is increased. This tendency is then particularly effective when the rotor 8 at least partly overlaps the extension 25 in the axial direction as is shown.

In the case shown, the separating wall 22 is rigidly connected to the bearing plate 13. Both parts thus form a constructional unit by way of which the assembly of the separating wall 22 in the rotor space 10 is simplified. This constructional unit may also contain the sealing formation 11 together with the covering cap 21. There thus results as a whole a constructional unit which may be quickly and cheaply assembled.

Alternatively it may also be proceeded such that the separating wall 22 is connected to the canned pot 9 as a separate part. This may for instance be by providing the separating wall 22 with a radial flange on the pump side which fits into a recess of the canned pot 9. This design is not shown. For achieving a constructional unit it may also be proceeded such that the separating wall 22 and the bearing plate 13 are composed of one piece.

Advantageously the electrical drive motor 5 for the centrifugal pump 4 is a submersible motor of the canned construction type which can preferably be operated at a higher rotational speed. It is however also possible to employ an electrical drive motor which is operated with an internal fluid cooling, wherein however this motor contains no can or canned pot so that in this case the stator 7 to a large extent is also flushed through with cooling fluid.

We claim:

1. A submersible motor for driving a centrifugal pump, said submersible motor comprising:

an upper end and a lower end, said upper end being mounted to said centrifugal pump;

a canned pot forming a rotor space within the submersible motor and having an axial motor shaft with a rotor being mounted on the motor shaft;

a sealing formation at the upper end of the submersible motor and being centrally penetrated by the motor shaft and sealing the rotor space from the centrifugal pump;

a stationary funnel-shaped separating wall within the rotor space with a larger upper end mounted at an upper end of the canned pot and with a smaller lower end which lies adjacent and near the motor shaft, the stationary funnel-shaped separating wall is disposed between a bearing plate and the rotor on the motor shaft and defines an inner smooth space within the rotor space lying adjacent to the motor shaft; and a gap between the smaller lower end of the stationary funnel-shaped separating wall and the motor shaft.

2. The submersible motor according to claim 1, wherein the stationary funnel-shaped wall tapers from its larger end towards its smaller lower end and comprises an axial sleeve-shaped extension at its smaller lower end extending towards the rotor of the motor.

3. The submersible motor according to claim 1 wherein said gap between the smaller lower end of the stationary funnel-shaped separating wall and the motor shaft is 0.1 to 0.5 times a diameter of the motor shaft.

4. The submersible motor according to claim 1, wherein a bearing plate is provided at the upper end of the canned pot within the rotor space, the bearing plate carrying a bearing assembly for the rotor shaft; and wherein the stationary funnel-shaped separating wall is fastened to the bearing plate.

5. The submersible motor according to claim 4, wherein the stationary funnel-shaped separating wall and the bearing plate consist of one piece.

6. The submersible motor according to claim 1, wherein said submersible motor is a motor with a high rotational speed.

\* \* \* \* \*